United States Patent [19]

Lefevre et al.

[11] 4,362,834

[45] Dec. 7, 1982

[54] EXTRUSION-GRADE VINYLIDENE CHLORIDE COPOLYMER COMPOSITIONS AND FILMS PREPARED THEREFROM

[75] Inventors: Lloyd E. Lefevre, Bay City; Fred Stevenson, Beaverton, both of Mich.

[73] Assignee: The Dow Chemical Company, Midland, Mich.

[21] Appl. No.: 212,645

[22] Filed: Dec. 3, 1980

Related U.S. Application Data

[63] Continuation-in-part of Ser. No. 106,202, Dec. 26, 1979, abandoned.

[51] Int. Cl.$^3$ .............................................. C08L 91/00
[52] U.S. Cl. .................................. 524/297; 252/56 S; 524/310; 524/315; 524/773; 525/302; 525/317
[58] Field of Search ................... 260/31.2 R, 31.8 R, 260/31.8 M, 31.8 G, 28.5 AV; 525/239; 252/56 S; 524/297, 310, 315, 773

[56] References Cited

U.S. PATENT DOCUMENTS

| | | |
|---|---|---|
| 3,125,545 | 3/1964 | Van Cleve et al. ................ 260/45.5 |
| 3,165,491 | 1/1965 | Butzler et al. ..................... 260/31.8 |
| 3,322,862 | 5/1967 | Havens et al. ..................... 260/897 |
| 3,509,236 | 4/1970 | Gross et al. ........................ 260/876 |
| 3,565,975 | 2/1971 | Goff et al. .......................... 260/897 |
| 3,607,980 | 9/1971 | Thomas et al. ................. 260/878 R |
| 3,625,348 | 12/1971 | Tichenal et al. .................. 206/46 F |
| 3,713,965 | 1/1973 | Widiger et al. ...................... 161/254 |
| 4,123,477 | 10/1978 | Watanabe et al. .................. 525/222 |
| 4,166,082 | 8/1979 | Hisazumi et al. ..................... 525/78 |
| 4,209,437 | 6/1980 | Fischer ........................... 260/31.8 R |
| 4,221,841 | 9/1980 | Hisazumi et al. ................... 428/497 |

FOREIGN PATENT DOCUMENTS

| | | |
|---|---|---|
| 798905 | 11/1968 | Canada . |
| 45-39103 | 12/1970 | Japan . |
| 46-21209 | 6/1971 | Japan . |
| 917083 | 1/1963 | United Kingdom . |
| 1075642 | 7/1967 | United Kingdom . |
| 798905 | 11/1968 | United Kingdom . |
| 1159940 | 7/1969 | United Kingdom . |

OTHER PUBLICATIONS

Abstract of Japanese Application 72-19170, (Jun. 1, 1972).

*Primary Examiner*—Theodore E. Pertilla
*Attorney, Agent, or Firm*—Lloyd E. Hessenaur, Jr.

[57] ABSTRACT

A vinylidene chloride copolymer composition manufactured by the addition of a grease copolymer, such as low molecular weight ethylene-vinyl-acetate copolymer, in place of or in combination with conventional plasticizer blend additions.

15 Claims, 1 Drawing Figure

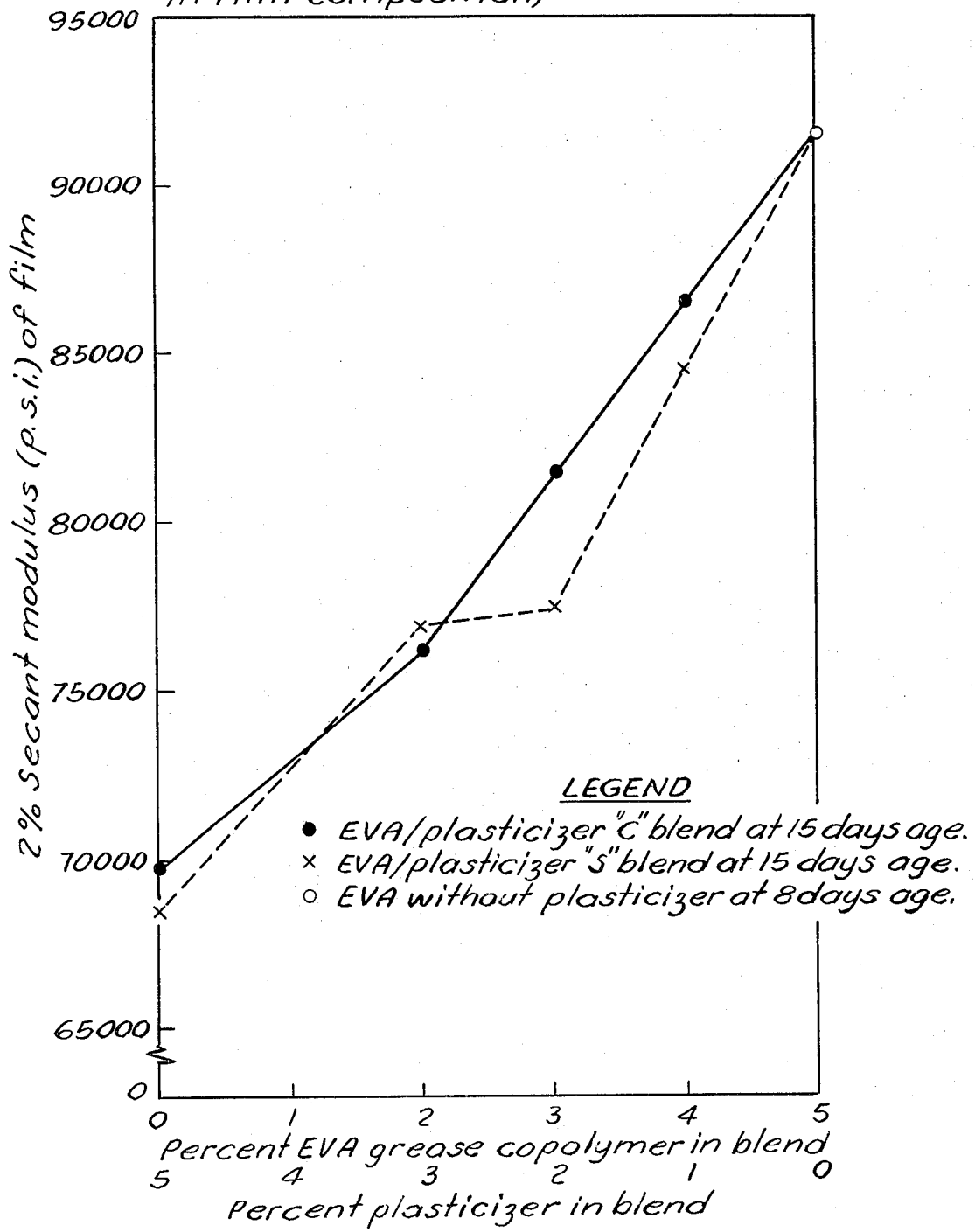

4,362,834

EXTRUSION-GRADE VINYLIDENE CHLORIDE COPOLYMER COMPOSITIONS AND FILMS PREPARED THEREFROM

CROSS-REFERENCE TO RELATED APPLICATION

The present application is a continuation-in-part of copending application Ser. No. 106,202, filed Dec. 26, 1979, now abandoned.

BACKGROUND OF THE INVENTION

This invention relates in general to extrusion-grade vinylidene chloride copolymer compositions and, additionally, to films prepared therefrom.

While many different materials, e.g., waxed papers, plastic coated papers, aluminum foil, and polyethylene film are used as protective wrapping, vinylidene chloride copolymer films are most widely used because of their low water and gas vapor transmission properties and resistance to mechanical and chemical deterioration as well as their adaptability to microwave cooking. In many instances, however, the vinylidene chloride copolymer film does not have sufficient cling and cohesion properties to adhere to itself when a small amount of pressure is applied as in household applications and, therefore, often does not adequately seal-in flavor, moisture, and other desirable properties of fresh or prepared food items.

Accordingly, various additives are frequently incorporated into the vinylidene chloride copolymer compositions from which film is made in order to increase the cling properties of the resulting film. In the case of extrusion grade vinylidene chloride copolymer compositions, for example, such additives are frequently in the form of liquids, such as citric acid esters, which typically perform the dual function of a cling enhancer as well as a plasticizer or extrusion aid.

Although the aforementioned additives have been useful in imparting cling properties to vinylidene chloride copolymer films containing them, such additives have introduced new problems. For example, the liquid cling additives have limited solubility in the vinylidene chloride copolymer resin and will sometimes exude to the surfaces of the film and excessively plate-out on or transfer to contacting members of film-making or film-handling machinery, thereby causing irregularities in operation or in the quality of the product.

Still further, such additives are incapable of providing high-cling properties while maintaining a balance of other physical properties. Although high-cling properties, which are required in films used for industrial application, can be achieved with the additives of the prior art by increasing the amount thereof, such increased cling is attended by a loss of good handleability. Either the films cling too much to themselves and present severe problems in handling because they cannot readily be pulled apart, (i.e., "a blocking" effect), or they are readily handleable but exhibit poor cling properties. In addition to the handleability problems effected by increasing the amount of such additives, other deleterious properties, such as increased permeability and cost, as well as decreased modulus of the film, tend to occur.

Accordingly, it is desirable to provide an extrusion grade vinylidene chloride copolymer composition capable of producing a film having inherent cling properties sufficient to enable it to form a seal upon the application of a small amount of pressure, yet which seal can be readily pulled apart. Furthermore, it would be desirable to provide such a high-cling/low-blocking film wherein the aforementioned problems of high permeability and cost, and decreased modulus are not as pronounced as in the past. It is also advantageous to provide such a composition having low vinylidene chloride and vinyl chloride residuals and low extractability of additives in use, which is easy to extrude and relatively inexpensive, has high-cling and is relatively stiff. This invention provides such a novel composition.

SUMMARY OF THE INVENTION

The present invention provides a high-cling thin film which comprises an extrusion grade vinylidene chloride copolymer resin and at least an effective cling-enhancing proportion up to about 10 weight percent of a grease copolymer, or a grease copolymer/conventional plasticizer blend. The grease copolymer is an ethylene and vinyl acetate copolymer having a peak molecular weight within the range from about 500 to about 7,500 as determined by gel permeation chromatography.

BRIEF DESCRIPTION OF THE DRAWING

The FIGURE of the drawing is a graphical illustration of the effect of varying the content of grease copolymer in a composition on the modulus of the film comprised of that composition.

DETAILED DESCRIPTION OF THE INVENTION

Vinylidene chloride copolymers ("Saran") which can be used in the practice of this invention are any copolymers which are obtained by copolymerizing a major proportion of vinylidene chloride monomer with at least one other comonomer and which are capable of forming a film product under extrusion conditions. Typically, such extrusion grade vinylidene chloride copolymers are crystalline in the normal state and contain from about 70 to about 95 weight percent of vinylidene chloride, with the remainder comprising one or more ethylenically unsaturated comonomers, such as vinyl chloride, vinyl acetate, vinyl propionate, acrylonitrile, alkyl and aralkyl (butyl) acrylates and methacrylates having alkyl and aralkyl groups of up to about 8 carbon atoms, acrylic acid, acrylamide, vinyl alkyl ethers, vinyl alkyl ketones, acrolein, allyl esters and ethers, butadiene, chloroprene and others. Representative ternary compositions which may be used include the polymers of vinylidene chloride with, for example, acrolein and vinyl chloride; acrylic acid and acrylonitrile; alkyl acrylates and alkyl methacrylates; acrylonitrile and butadiene; acrylonitrile and itaconic acid; acrylonitrile and vinyl acetate, vinyl propionate, or vinyl chloride; alkyl esters or ethers and vinyl chloride; butadiene and vinyl acetate, vinyl propionate, or vinyl chloride; and vinyl ethers and vinyl chloride. Quaternary and higher polymers of similar monomeric compositions, as well as blends of vinylidene chloride copolymers, may also be used advantageously.

The vinylidene chloride copolymers can be made by any manner suitable for preparing extrusion grade resins of such copolymers such as by polymerization in mass or in an aqueous medium through the techniques of suspension or emulsion polymerization.

Copolymers of ethylene and vinyl acetate ("EVA") which can be used generally comprise about 10 to about 55 weight percent, preferably about 35 to about 50 weight percent vinyl acetate, including the partially hydrolyzed derivatives thereof. Minor amounts of other copolymerizable monomers can also be included in the copolymer, so long as they do not deleteriously affect the properties thereof. Copolymers suitable for use as cling additives in the vinylidene chloride copolymer films of this invention are generally characterized as greases or oils. Typically, such copolymers have peak molecular weights, as determined by gel permeation chromatography, in the range from about 500 to about 7,500, preferably from about 1,000 to about 4,000. Gel permeation chromatographic methods for determining molecular weights of polymers are described by J. C. Moore in the *J. Polymer Sci. A.*, 2, 835 (1964). See also L. H. Tung, *J. Appl. Polymer Sci.*, 10, 345 (1966) and W. N. Smith, *J. Appl. Polymer Sci.*, 11, 639 (1967). Since such copolymers have melt flow rates above those which can be accurately measured by ASTM D-1238-70(E) at 190° C. and 2.16 kilograms, it is necessary to alter some of the conditions of this test method in order to obtain more meaningful values. Using the apparatus and procedures of ASTM D-1238-70(E) except that the diameter of the plastometer orifice is reduced to 0.0200±0.0002 inch and the test temperature is 80° C., the copolymers utilized in this invention exhibit melt flow rates in the range from about 5 to about 50, preferably from about 10 to about 25, decigrams/minute (dg/min).

The low molecular weight or grease copolymers can be prepared by polymerizing the corresponding monomers at high temperatures and pressures in the presence of a free radical catalyst. While forming the grease copolymer is not part of this invention, a suitable means of preparation is described in U.S. Pat. No. 2,395,381 except that higher temperatures and increased catalyst concentration are used. In a preferred method up to about 20 weight percent based on the total comonomer weight of a telomer such as ethylene or propylene is added to the polymerization zone to inhibit the formation of high molecular weight copolymers.

The amount of grease copolymer or grease copolymer/conventional plasticizer blend to be added to the extrusion grade vinylidene chloride copolymer will depend upon the degree of cling properties and stiffness desired in the film product. Generally, the proportion of the grease copolymer or grease copolymer/conventional plasticizer blend is from an effective cling-enhancing amount to about 10, preferably from about 0.1 to about 7, weight percent of the extrusion grade composition. This use of less than 10 weight percent of the grease copolymer or grease copolymer blend achieves the desired result without adversely affecting the character of the film product. The actual amount required to achieve the desired cling properties will vary with molecular weight of the grease copolymer and the proportion of ester comonomer in the copolymer.

The most desirable embodiments of the present invention comprehend substitution of nearly all or all of the conventional plasticizers with the grease copolymer. However, on occasion a one hundred percent substitution can result in handling difficulties because of the tackiness of the grease copolymer. Accordingly, while a full substitution is most desired as far as the resultant product is involved, it has been found that less than full substitution can alleviate the handling difficulties sometimes experienced. In a blend of grease copolymer and conventional plasticizers, as the amount of grease copolymer decreases with respect to the amount of the conventional plasticizer, the modulus or stiffness of the film has been found to decrease significantly. This relationship is illustrated graphically in the FIGURE of the drawing and in the Examples K33-2 through K33-7 found in TABLE 1.

The illustration and examples are all taken with the EVA grease copolymer or EVA grease copolymer/conventional plasticizer blend as comprising about 5 percent of the entire composition for the vinylidene chloride copolymer film tested, the composition also including about 1 percent stabilizer. The conventional plasticizers blended with the EVA grease copolymer were Santicizer 160 plasticizer, a butyl/benzyl phthalate, and Citroflex A-4 plasticizer, a citric acid (non-polymeric) ester. Actual numbers showing a decrease in modulus as the ratio of conventional plasticizer is increased in proportion to the EVA grease copolymer in a so-called Saran resin "B" found in Table 1 Examples K33-2 through K33-7 with K34-1, K34-2 and K34-3 being the controls, the type "B" Saran resins being the same type of Saran resin. Although the controls have a different aging period from the 15-day period of the blends, the controls are related as they each have the same 8-day aging period. The FIGURE shows the effect of increasing the percentage of EVA grease copolymer to the conventional plasticizer even more dramatically. As the amount of "C Plasticizer" (Citroflex A-4 plasticizer) or "S Plasticizer" (Santicizer 160 plasticizer) is decreased and the EVA grease copolymer increased the modulus is increased from about 70,000 psi to about 90,000 psi.

A ratio of about 20 percent conventional plasticizer to about 80 percent EVA grease copolymer essentially alleviates the handling difficulties sometimes found in using 100 percent EVA grease copolymer and 0 percent conventional plasticizer, yet still retain an exceptionally high modulus, about 85,000 in the examples, in the film. Thus an economical vinylidene chloride copolymer or Saran film with desired stiffness can be achieved if the predominant plasticizing component in the composition is an EVA grease copolymer of the type hereinbefore described. Even lesser proportions of EVA grease copolymer to conventional plasticizers will add stiffness to the resulting film.

For example, the quantity of conventional plasticizer, such as a non-polymeric ester, can comprise about 30 parts to about 70 parts by weight of the EVA grease copolymer/conventional plasticizer blend as a plasticizer mixture, with the EVA grease copolymer comprising the balance of the blend, as a plasticizing mixture. It must be recognized, however, that as the percentage of conventional plasticizer increases with respect to the EVA grease copolymer, stiffness is sacrificed.

Where needed or desired, conventional additives may be included with the extrusion grade composition, such as heat stabilizers and the like. Antioxidants, such as those used with conventional cling additives, have not been found to be necessary for the grease copolymers used in the present invention. If desired, however, a minor amount of such materials may be used.

The blending of the extrusion grade vinylidene chloride copolymer with a grease copolymer or a grease copolymer/conventional plasticizer blend, plus other additives, if any, can be carried out in conventional resin blending processes and equipment, such as homogenizing blenders or possibly mixing extruders. It is advantageous that all components be as thoroughly mixed as possible so as to improve the cling efficiency contributed by the low molecular weight grease copolymer. Due to the viscous nature of the grease copolymer additive, it is particularly advantageous for thorough mixing that the low molecular weight copolymer be slightly heated before being mixed with the vinylidene chloride copolymer. With a grease copolymer/conventional plasticizer blend, heating may be optional. Although not the only method, a most beneficial and convenient method of obtaining thorough mixing comprises adding the grease copolymer or grease copolymer/conventional plasticizer blend to the polymerization reactor with the monomers used to prepare the vinylidene chloride copolymer. In larger reactors used for polymerization in an aqueous medium, however, care should be taken to avoid adding the grease copolymer or grease copolymer/conventional plasticizer blend after the dispersion of monomers has been formed, since such could create a layer of copolymer on the surface of the aqueous medium which would later interfere with the addition of a polymerization terminator, as such is frequently practiced in the art.

The blends of the vinylidene chloride copolymer and low molecular weight grease copolymer blends or grease copolymer/conventional plasticizer blends, prepared by any of the aforementioned variations, can be formed into a thin film by any of the conventional methods known for making films from vinylidene chloride copolymers, such as the cast film process or the trapped bubble/blown film process. Films made in accordance with this invention usually range in thickness from about 0.2 mil (0.0051 mm) to about 1.5 mil (0.038 mm), preferably from 0.4 mil (0.0102 mm) to 1 mil (0.0254 mm), although thicker films or sheets can be made if desired.

The examples in the Tables that follow illustrate the invention but are not to be taken as limiting its scope. In the examples, parts and percentages are by weight unless otherwise indicated or required by context.

Films were tested for cling by a method consisting of preparing a first portion and a second portion of the film to be tested, both portions having dimensions of 5 inches by 8 inches. The first portion is then secured lengthwise, i.e., by taping the ends, to the upper surface of a metal plate which is inclined 30° from horizontal and securely mounted on a top-loading balance. The second portion of film is then superimposed upon the first in a face-to-face relationship and the uppermost edge of the second portion is secured by taping leaving the lowermost edge of the second portion free. It is essential that the portions be superimposed without wrinkles, creases, or bubbles. The lowermost, free edge of the second portion is then clamped and attached to a wire hanger, which is in turn attached to the bottom of a movable cart. The cart travels by a system of pulleys and motor upon a raised, inclined track in such fashion that the free end of the second portion of the film will be pulled upward away from the first portion in a continuous vertical direction, thereby peeling or separating the two portions of film so as to propagate the peeled front at a constant rate of 5 inches per minute. The average force (in grams) required to separate the two portions is then read from the balance.

Block, which is essentially long-term cling, is measured by carefully removing intact two superimposed film portions from a roll of film which had been aged more than one week, and then determining the force required to separate the film portions in a manner similar to that used for measuring cling.

Runs were made comparing the physical characteristics of the prior art practice of blending Citroflex A-4 plasticizer or Santicizer 160 plasticizer with the vinylidene chloride copolymer as against the in-monomer addition of an ethylene vinyl-acetate grease copolymer or grease copolymer/conventional plasticizer blend to the same vinylidene chloride copolymer, comparing stiffness (measured by 2% Secant modulus) block and cling (as measured by a 30 day cling tester).

TABLE 1

PHYSICAL PROPERTIES OF VINYLIDENE CHLORIDE COPOLYMER FILM MADE BY POST ADDITION OF PLASTICIZERS VERSUS IN-MONOMER ADDITION OF COPOLYMER GREASE

| Run No. | Saran (Vinylidene copolymer) Resin | Percent Paraplex G-60 Additive | Percent Plasticizer/Cling Additive | | Ethylene Copolymer Grease | Stiffness 2% Secant Modulus (psi) | Film Age (days) | 30-day Cling Test | | $O_2TR$* |
|---|---|---|---|---|---|---|---|---|---|---|
| | | | Santicizer 160 Plasticizer | Citroflex A-4 Plasticizer | | | | Block (grams) | Cling (grams) | |
| K33-1 | A | 1.0 | — | 4.5 | — | 84,500 | 15 | 5.5 | 4.0 | 1.0 |
| K34-1 | B | 1.0 | — | 5.0 | — | 69,700 | 8 | 7.0 | 4.5 | — |
| K34-2 | B | 1.0 | 5.0 | — | — | 68,500 | 8 | 12.0 | 5.5 | 1.17 |
| K34-3 | B | 1.0 | — | — | 5.0 | 91,500 | 8 | 9.0 | 7.0 | 0.99 |
| K37-1 | A | 1.0 | — | 4.5 | — | 58,050 | 8 | 10.0 | 6.0 | — |
| | | | | | | 81,900 | 53 | | | |
| K37-2 | B | 1.0 | — | — | 4.5 | 86,850 | 8 | 7.0 | 5.5 | — |
| | | | | | | 110,000 | 53 | | | |
| K37-3 | B | 1.0 | — | — | 5.0 | 78,900 | 8 | 8.0 | 7.0 | — |
| | | | | | | 103,900 | 53 | | | |
| K43-1 | A | 1.0 | — | 4.5 | — | 85,100 | 27 | 7.0 | 4.0 | — |
| K43-2 | B | 1.0 | — | — | 5.0 | 98,500 | 27 | 7.0 | 6.0 | — |
| K43-3 | B | 1.0 | — | — | 5.0 | 109,000 | 30 | 10.0 | 9.5 | — |
| K33-2 | B | 1.0 | 2.0 | — | 3.0 | 77,600 | 15 | 7.0 | 4.5 | 1.08 |
| K33-3 | B | 1.0 | — | 3.0 | 2.0 | 76,100 | 15 | 7.5 | 5.0 | 1.34 |
| K33-4 | B | 1.0 | — | 2.0 | 3.0 | 81,000 | 15 | 6.5 | 5.0 | 1.16 |
| K33-5 | B | 1.0 | 3.0 | — | 2.0 | 77,000 | 15 | 6.0 | 4.5 | 1.02 |
| K33-6 | B | 1.0 | — | 1.0 | 4.0 | 86,700 | 15 | 6.0 | 4.0 | 1.00 |
| K33-7 | B | 1.0 | 1.0 | — | 4.0 | 84,500 | 15 | 6.0 | 4.0 | 0.97 |

*TR = Transmission Rate

As shown in Table 1, the stiffness is higher when the copolymer grease is used replacing all or some of the conventional plasticizer. Grams cling particularly measured after 27/30 days aging is also higher where the copolymer grease is used. Limited oxygen transmission data indicated almost no change. A stiffer film with higher cling is particularly advantageous for household film in that the film is less likely to tangle, tears easier from the roll, holds better to itself for sealing and gives a feeling of strength to the user. The copolymer grease blends well and acts as an extrusion aid. It does not require operating conditions which significantly effect the degradation (color) of the vinylidene chloride copolymer resin.

It was also found that residual vinyl chloride and vinylidene chloride monomer levels were significantly lowered by use of the in-monomer addition of the grease copolymer without conventional plasticizer as compared with traditionally plasticized resins. The following Table 2 demonstrates the residual monomer data found. Run No. 4955 was made with the traditionally plasticized vinylidene chloride copolymer resins, the other runs with the same vinylidene chloride copolymer resin only using the in-monomer addition of the grease copolymer as contemplated by the present invention in place of the plasticizer.

TABLE 2

RESIDUAL MONOMER DATA (DRIED RESIN)

| Run No. | Residual Vinyl Chloride | Residual Vinylidene Chloride |
|---|---|---|
| R1-4955 (Control) | 0.1 ppm | 47.0 ppm |
| R1-4957 | 10.4 ppb | 2.0 ppm |
| R1-4962 | 58.0 ppb | * |
| R1-4964 | 10.0 ppb | * |
| R1-4969 | F3 ppb | * |
| R1-4972 | F3 ppb | * |
| R1-4973 | F3 ppb | * | ppm = parts per million
ppb = parts per billion
*No data available

The grease copolymer used in the present invention is highly viscous and customarily of a sticky nature making it an inconvenient material to handle and clean. Proper handling and transferring must be observed. However, the many advantages of using this material, certainly outweigh the small degree of handling inconvenience.

While certain representative embodiments and details have been shown for purpose of illustrating the invention, it will be apparent to those skilled in the art that various changes and applications can be made therein without departing from the spirit and scope of the invention.

What is claimed is:

1. A high-cling thin film which comprises an extrudable copolymer resin having a major proportion of vinylidene chloride monomer with at least one other comonomer, and at least an effective cling-enhancing proportion of less than 10 weight percent of a grease copolymer having a peak molecular weight within the range from about 500 to about 7,500 as determined by gel permeation chromatography.

2. The high-cling film of claim 1 wherein the grease copolymer comprises an ethylene and vinyl acetate copolymer resin.

3. The high-cling film of claim 2 wherein the proportion of vinyl acetate is from about 35 to about 50 weight percent of the grease copolymer and the peak molecular weight is within the range of from about 1000 to about 4000 as determined by gel permeation chromatography.

4. The high-cling film of claim 1 wherein the proportion of copolymer is from about 0.1 to about 7 weight percent of the film composition.

5. A method for preparing a vinylidene chloride copolymer composition having high-cling and reduced vinylidene chloride and/or vinyl chloride residuals, the process comprising the step of adding to the composition prior to polymerization a grease copolymer having a peak molecular weight within the range of from about 500 to 7,500 as determined by gel permeation chromatography, and polymerizing the copolymer composition with the in-monomer grease copolymer addition.

6. A film or sheet extruded from the vinylidene chloride composition formed from the process of claim 5, said film or sheet having a cling value in excess of 5 grams as measured by a 30 day cling test and a stiffness in excess of 75,000 psi after 15 days aging as defined by a 2% Secant Modulus test.

7. The high-cling film or claim 2 wherein minor amounts of additives other than the grease copolymer are included in the film composition.

8. The high-cling film of claim 7 including a conventional plasticizer blended with the grease copolymer resin.

9. The high-cling film of claim 8 wherein the grease copolymer and plasticizer blend comprises up to about 7 percent by weight of the total film composition.

10. The high-cling film of claim 9 wherein the grease copolymer is predominant in the grease copolymer and conventional plasticizer blend.

11. The high-cling film of claim 9 wherein the grease copolymer comprises at least 80 percent by weight of the grease copolymer and conventional plasticizer blend.

12. The method of claim 5 wherein a conventional plasticizer is blended as a mixture with the grease copolymer resin.

13. A plasticizer mixture comprising from about 20 to less than 100 parts by weight of a low molecular weight ethylene-vinyl acetate grease copolymer and from greater than zero parts to about 80 parts by weight of at least one non-polymeric ester.

14. The plasticizer mixture of claim 13 wherein the same comprises from about 30 to about 70 parts by weight of an ethylene-vinyl acetate copolymer and from about 70 to about 30 parts by weight of at least one non-polymeric ester.

15. The mixture of claim 14 wherein the ethylene-vinyl acetate copolymer is a grease copolymer.

* * * * *